Patented Apr. 3, 1945

2,372,709

UNITED STATES PATENT OFFICE 2,372,709

PREPARATION OF BENZOIN

Oliver W. Cass and Charles A. Bordner, Niagara Falls, N. Y., assignors to E. I. du Pont de Nemours & Company, Wilmington, Del., a corporation of Delaware No Drawing. Application March 24, 1943,
Serial No. 480,378

3 Claims. (Cl. 260—590)

This invention relates to the preparation of benzoin by condensation of benzaldehyde. More particularly, it is directed to a new and improved process for the continuous manufacture of benzoin from technical grade benzaldehyde, which process is capable of being carried out under circumstances wherein the danger of sudden reaction with the liberation of large amounts of heat is greatly reduced, this process utilizing inexpensive and industrially available products as suspending medium and condensing agent.

The reaction involving the condensation of 2 moles of benzaldehyde to form benzoin

has generally been characterized by the development of large amounts of heat, due to the formed product first dissolving in excess benzaldehyde, and then precipitating out all at once, with the release of considerable heat. For this reason it has been but little practiced on the commercial scale, the production of benzoin by this method being generally restricted to small amounts prepared by batch operations.

We have now developed a new and improved method wherein benzaldehyde may be condensed to benzoin in a continuous process, capable of operation on the industrial scale without danger of excessive violence of reaction or overheating. Our process specifically involves feeding the benzaldehyde and the solvent system containing the alkaline condensing agent simultaneously to the reaction vessel, and continuously drawing off the benzoin, as formed, with the solvent system, there being present in the reaction vessel no considerable amount of excess benzaldehyde in which the benzoin can dissolve.

Accordingly, one of the objects of our invention is to render available for industrial application a process for condensing benzaldehyde to form benzoin, the process being capable of continous operation and without attendant danger when operated under factory conditions. Another object of this invention is to develop a process wherein the benzaldehyde and solvent system containing the alkaline condensing agent are fed continuously and in controlled amounts to the reaction vessel, the benzoin and solvent being continuously withdrawn therefrom. Still another object of this invention is to render available for commercial utilization a procedure which utilizes, as the solvent system, a methanol-water mixture instead of the solvent which was previously considered necessary in such condensing operations, ethanol. In this way it is possible to avoid the difficulties usually associated with the use of ethanol in industrial processes owing to the necessity of complying with regulations of the Bureau of Internal Revenue. Still another object is to render available a process capable of employing technical grade benzaldehyde as starting material.

In carrying out our process the benzaldehyde is conveyed by one conduit to the reaction vessel, and the solvent system containing the alkaline condensing agent conveyed in a separate conduit to this vessel. The solvent system comprises a mixture of methanol and water, the methanol constituent of which may be present in varying proportions. A small amount of sodium cyanide as alkaline condensing agent, an amount generally less than 5% of the weight of the solvent system, is contained in this methanol-water solution. The solvent system serves to provide a medium capable of dissolving benzaldehyde to a greater extent than would be possible by the use of water alone.

The benzaldehyde and solvent system may be either added continuously or in the form of small incremental amounts to the reaction pot, which is provided with a stirrer and reflux condenser. After the introduction of a sufficient amount of the starting charge the reaction vessel is heated to a temperature which is generally in the neighborhood of 75° C. or higher, at which elevated temperature the reaction is initiated. In order to avoid losses due to foaming or overflow, as well as losses due to vaporization from the reaction vessel, the main reaction chamber is provided with an auxiliary side receiver connected by means of a conduit with the main vessel. That part of the charge which would normally tend to find its way out of the principal reaction vessel flows to the auxiliary chamber, which may also be heated, if necessary, to insure the continuance of the reaction in this auxiliary receiver with that portion of the benzaldehyde transferred thereto. Normally the product is withdrawn from this auxiliary receiver and removed from the solvent system by filtration, the solvent being returned to the reactor with additional amounts of benzaldehyde for re-utilization.

By carrying out the reaction continuously in this manner, and by providing an auxiliary receiver which may be removed when full and replaced with an empty one, we have found that the reaction proceeds rapidly and smoothly, without any danger of excessive vigor or violence. This is distinguished from the usual batch type process which is generally characterized by strong exothermic conditions as the benzoin begins to precipitate out, thus causing the losses of both solvent and product. Moreover we have found that it is possible to utilize commercial benzaldehyde, i. e., the technical grade, in our improved continuous method with very satisfactory results, whereas substantially pure benzaldehyde is essential for satisfactory yields in the batch processes.

It is generally known that benzoin of a greater degree of purity may be prepared by utilizing higher solvent-to-product ratios in the reaction vessel. In batch processes economic considerations limit the extent of dilution possible, whereas in our continuous process, where the solvent mixture is continuously recycled, it is possible to secure very high solvent-to-product ratios without undue difficulty. Moreover, the provision of an auxiliary receiver which is heated to reaction temperature permits condensation to benzoin therein of any unreacted benzaldehyde which may reach this receiver.

Another advantage of the continuous process herein described, as compared with batch processes, is that it is possible to clean up the solvent system from time to time by the use of activated carbon, thereby rendering unnecessary repeated distillations to purify this liquid, and permitting repeated reutilization of the solvent system for successive amounts of product. The amount of benzoin produced per pound of solvent utilized is, of course, much greater in our process than in batch methods.

Our improved continuous process for the preparation of benzoin from technical grade benzaldehyde may be illustrated by the following typical example:

Example

The apparatus utilized consisted essentially of a three-necked flask equipped with a mechanical stirrer, reflux condenser, thermometer, and Y-tube inlet for introducing benzaldehyde and solvent. The flask was provided with an overflow tube formed of 25-millimeter glass tubing leading into the side of the flask, so that when the latter became approximately half full, excess solvent and product therein spilled over into an auxiliary heated receiver.

The reactor was charged with 625 cubic centimeters of methanol, half a liter of water, and 50 grams of sodium cyanide (96% technical grade). Heat was applied, with stirring, and the reaction mixture brought to reflux temperature. Benzaldehyde was then added at the rate of 10 cubic centimeters per minute until a total of 250 cubic centimeters had been added.

By this time the benzoin had begun to separate and the vigorous exothermic stage of the reaction had been passed. The second and all subsequent 250 cubic centimeter portions of benzaldehyde were added at the rate of 10 cubic centimeters per minute, together with sufficient solvent to maintain the concentration of benzoin in the reaction vessel approximately constant. When the auxiliary receiver was full it was replaced by an empty one.

The product was filtered from the solvent mixture, and washed on the Buchner funnel utilizing first half a liter of hot 1% sodium carbonate solution, then half a liter of hot water. The solid product was dried overnight in an oven at a temperature of 55 to 70° C., the filtrate being returned to the reaction vessel with fresh charges of benzaldehyde.

The process was thus a continuous one, benzoin as a slurry of the solid in the solvent system being removed from the receiver as formed, and additional amounts of benzaldehyde continuously supplied to the reaction vessel at the rate of 10 cubic centimeters per minute. The yield was 89%, based on the amount of technical grade benzaldehyde reacted.

Various changes may be made in our process without departing from the spirit or scope of the invention, and these changes are intended to be comprehended within the scope of the appended claims.

What we claim as new and desire to secure by Letters Patent of the United States is:

1. A continuous process for the production of benzoin from benzaldehyde which comprises: introducing benzaldehyde and a solvent system comprising methanol and water and containing therein, as alkaline condensing agent, sodium cyanide, into a reaction vessel; continuously removing from said reaction vessel, in the form of a slurry, the formed benzoin suspended in said solvent system; recovering the benzoin from said slurry; and returning said solvent system containing said alkaline condensing agent, together with further amounts of benzaldehyde, to said reaction vessel for conversion to further amounts of benzoin.

2. A continuous process for the production of benzoin from benzaldehyde which comprises: continuously supplying benzaldehyde, in small measured amounts, together with a solvent system comprising methanol and water and containing therein, as alkaline condensing agent, sodium cyanide, to a reaction vessel heated to a temperature of at least 75° C.; continuously removing from said reaction vessel, in the form of a slurry, the formed benzoin suspended in said solvent system; filtering said slurry to recover said benzoin; and continuously returning said solvent system containing said alkaline condensing agent, together with further amounts of benzaldehyde, to said reaction vessel for conversion to further amounts of benzoin.

3. A continuous process for the production of benzoin from technical grade benzaldehyde which comprises: continuously supplying technical grade benzaldehyde, in small measured amounts, together with a solvent system comprising methanol and water and containing therein, as alkaline condensing agent, sodium cyanide, to a reaction vessel heated to a temperature of at least 75° C.; continuously removing from said reaction vessel, in the form of a slurry, the formed benzoin suspended in said solvent system; filtering said slurry to recover said benzoin; and continuously returning said solvent system containing said alkaline condensing agent, together with further amounts of technical grade benzaldehyde, to said reaction vessel for conversion to further amounts of benzoin.

OLIVER W. CASS.
CHARLES A. BORDNER.